United States Patent
Perez

(10) Patent No.: US 9,112,898 B2
(45) Date of Patent: Aug. 18, 2015

(54) SECURITY ARCHITECTURE FOR MALICIOUS INPUT

(71) Applicant: Verizon Patent and Licensing Inc., Basking Ridge, NJ (US)

(72) Inventor: John Scott Perez, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 14/085,910

(22) Filed: Nov. 21, 2013

(65) Prior Publication Data

US 2015/0143517 A1    May 21, 2015

(51) Int. Cl.
*H04L 29/06* (2006.01)

(52) U.S. Cl.
CPC .................................. *H04L 63/1441* (2013.01)

(58) Field of Classification Search
CPC .. H04L 63/1441; H04L 63/1458; G06F 21/55
USPC .......................................................... 726/22
See application file for complete search history.

(56) References Cited

U.S. PATENT DOCUMENTS

| | | | |
|---|---|---|---|
| 2002/0199109 A1* | 12/2002 | Boom | 713/188 |
| 2008/0109905 A1* | 5/2008 | Grosse et al. | 726/23 |
| 2008/0127349 A1* | 5/2008 | Ormazabal et al. | 726/25 |
| 2008/0148402 A1* | 6/2008 | Bogineni et al. | 726/22 |
| 2008/0320582 A1* | 12/2008 | Chen et al. | 726/12 |
| 2011/0167493 A1* | 7/2011 | Song et al. | 726/23 |
| 2012/0174217 A1* | 7/2012 | Ormazabal | 726/22 |
| 2013/0291107 A1* | 10/2013 | Marck et al. | 726/23 |

\* cited by examiner

*Primary Examiner* — Michael S McNally

(57) ABSTRACT

A computing device detects and mitigates malicious input at the point of origin before such input invades a communication network. A computing device receives, at an operating system kernel, a first input string and stores, in a cache accessible to the kernel, a copy of the first input string. The computing device receives, by the operating system kernel, a second input string and compares the copy of the first input string and the second input string for redundancy before committing the second input string to an application or communication interface. The computer device rejects the second input when the comparing indicates that the copy of the first input string and the second input string are redundant.

20 Claims, 12 Drawing Sheets

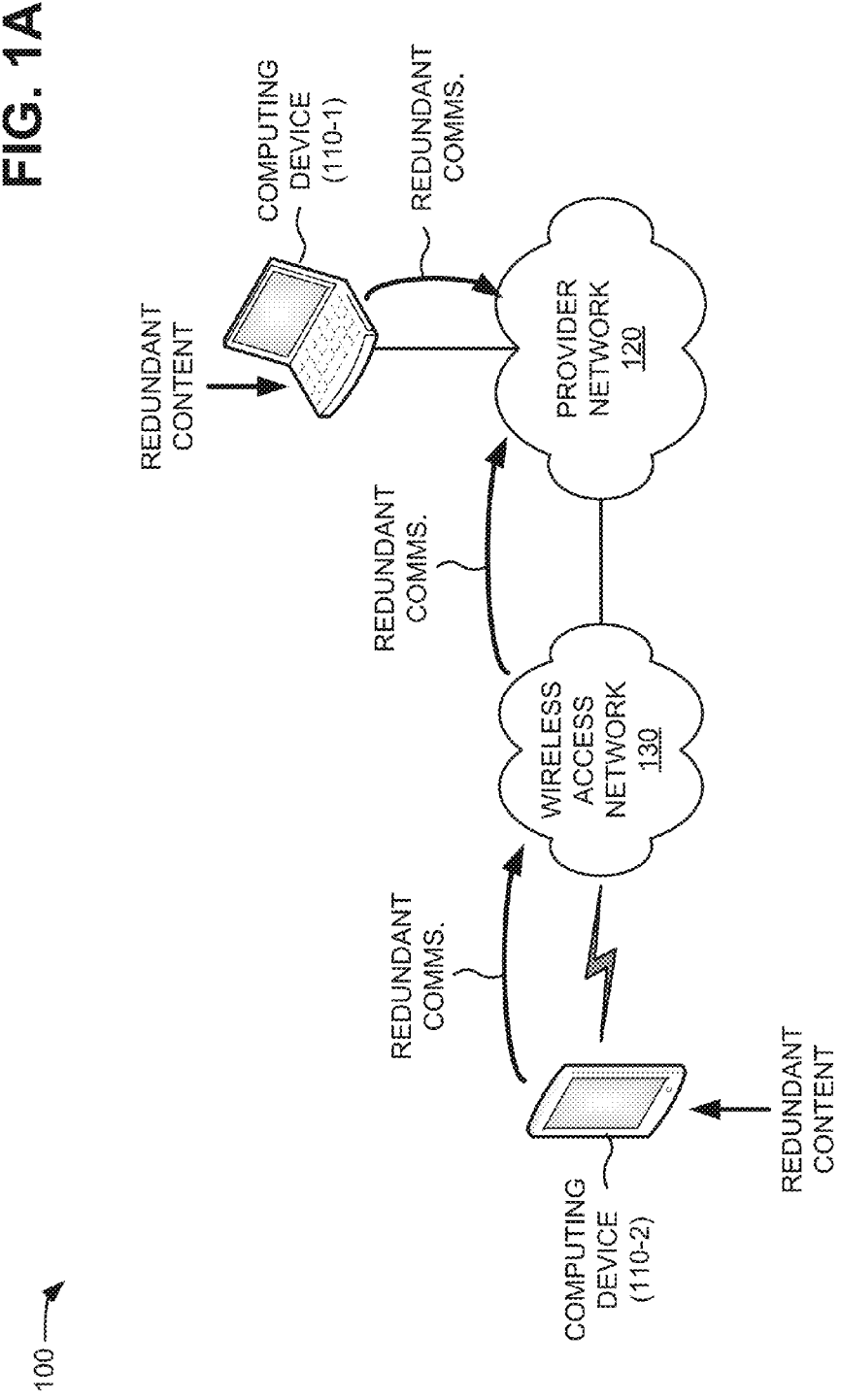

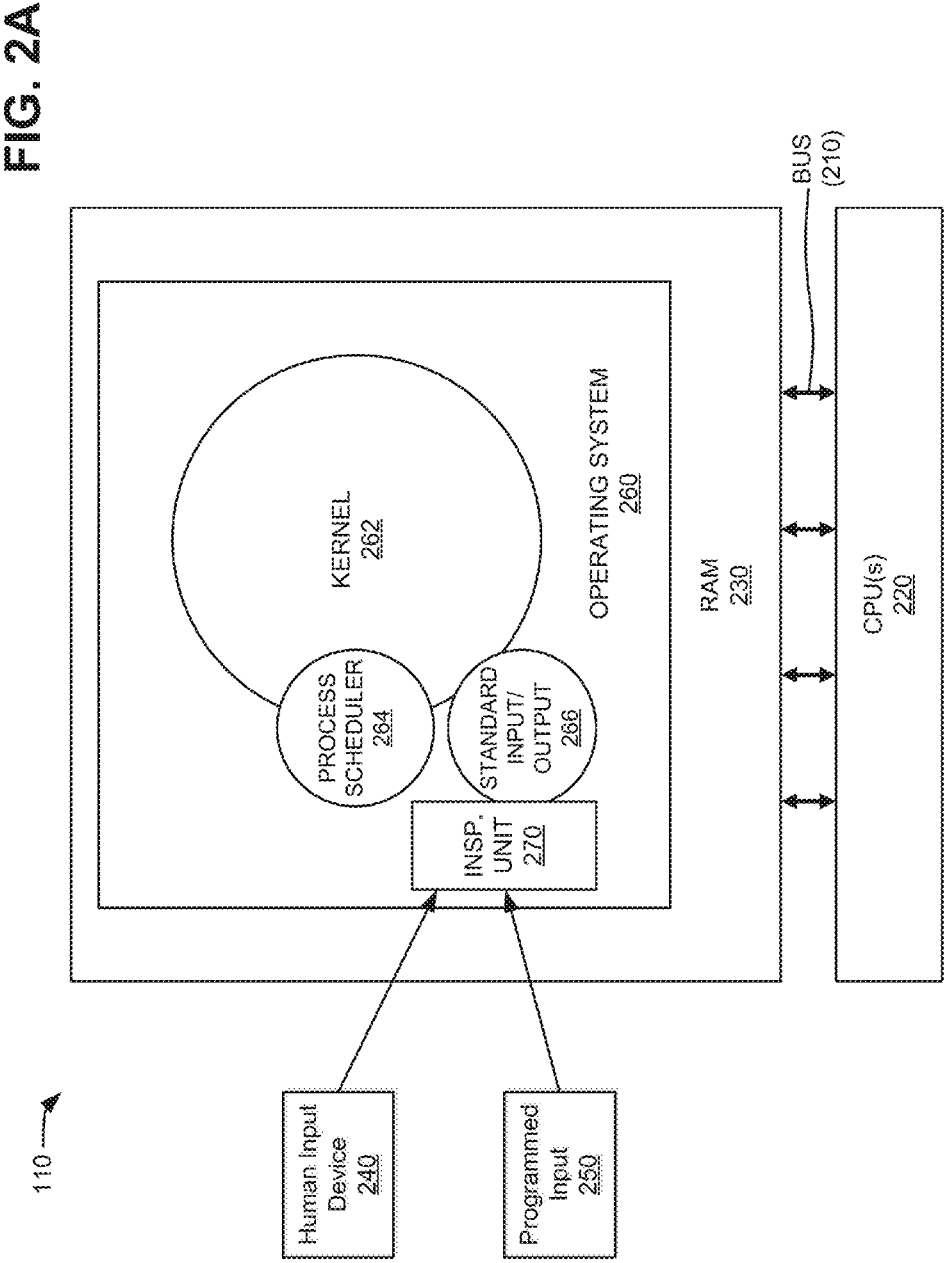

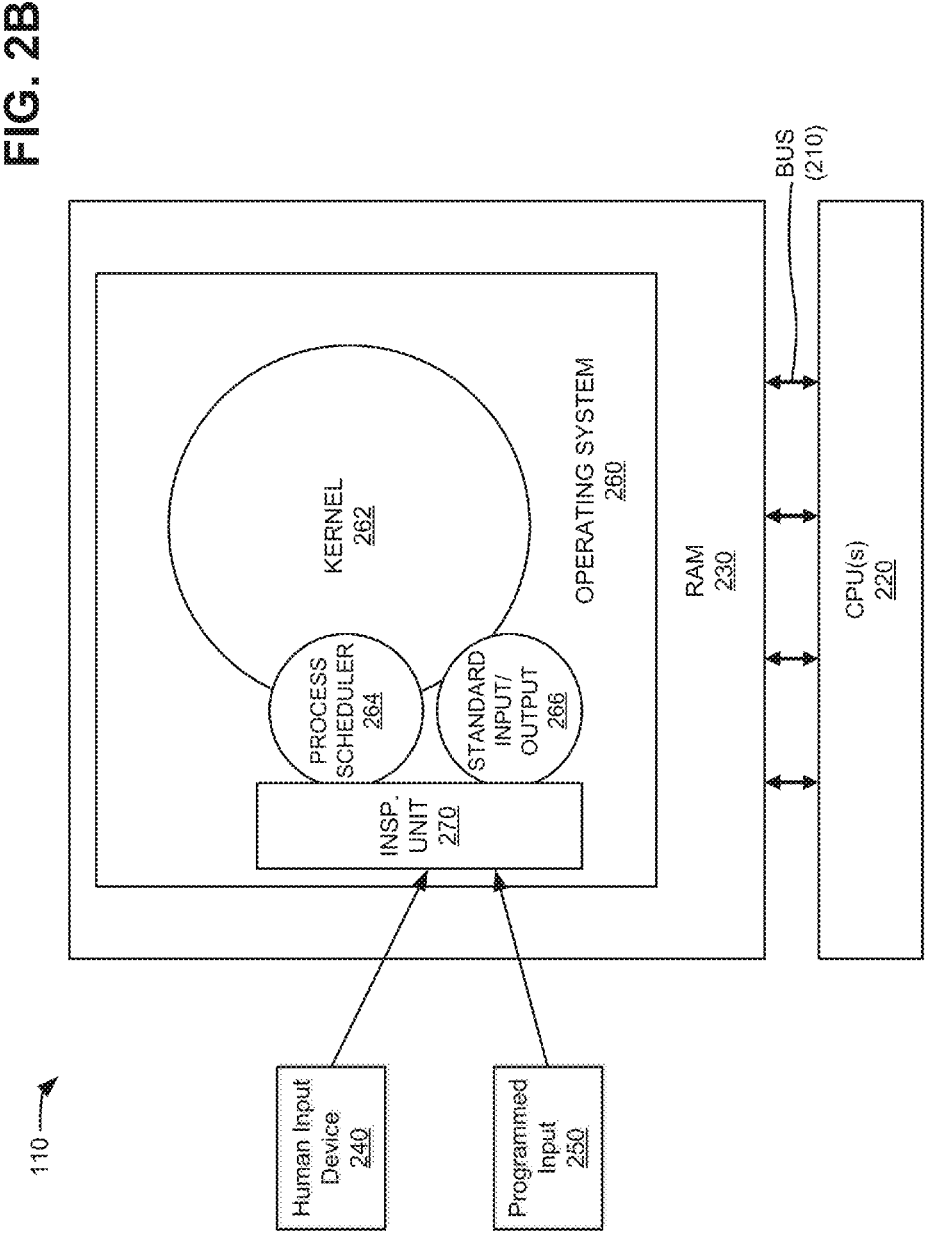

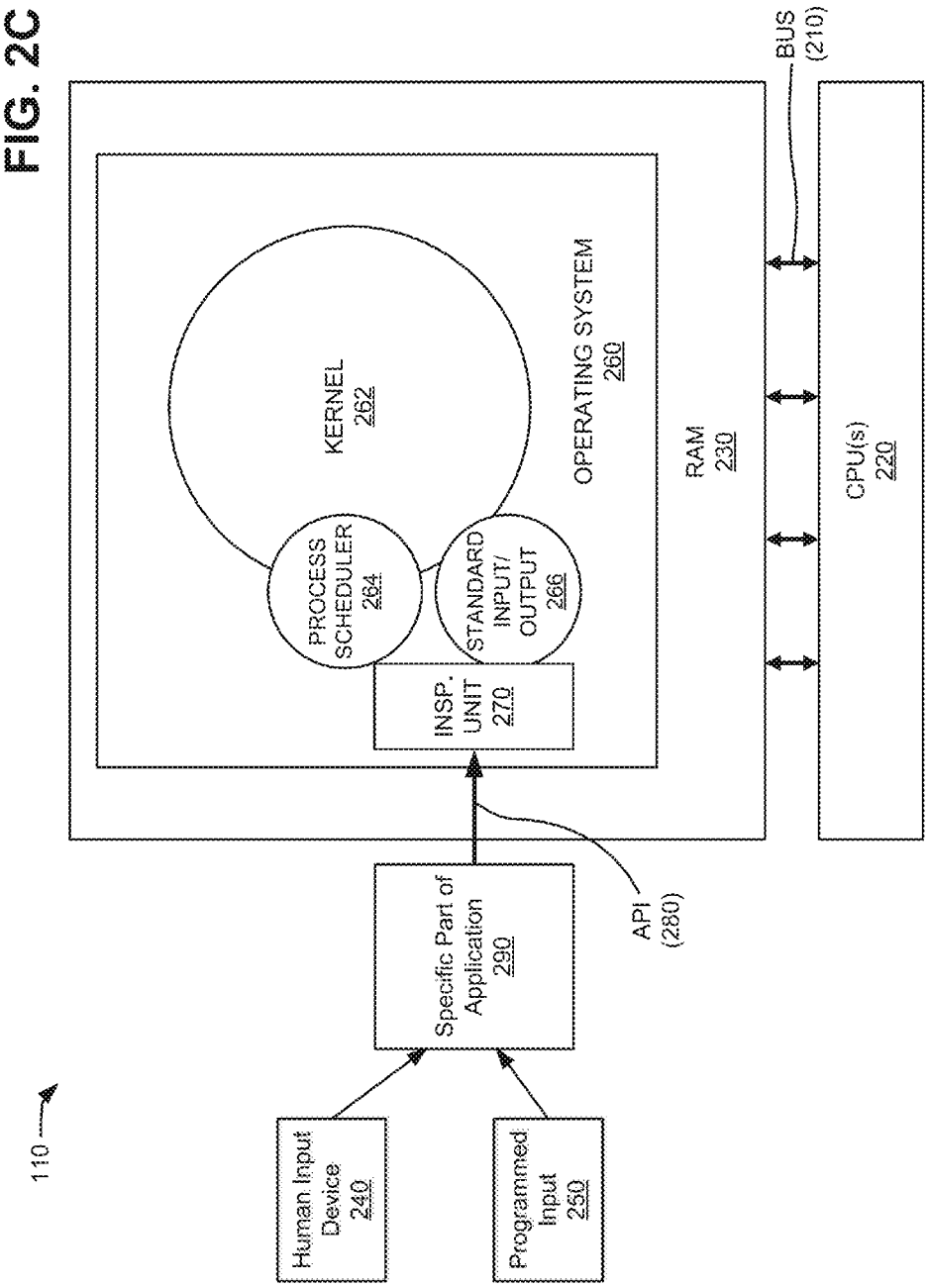

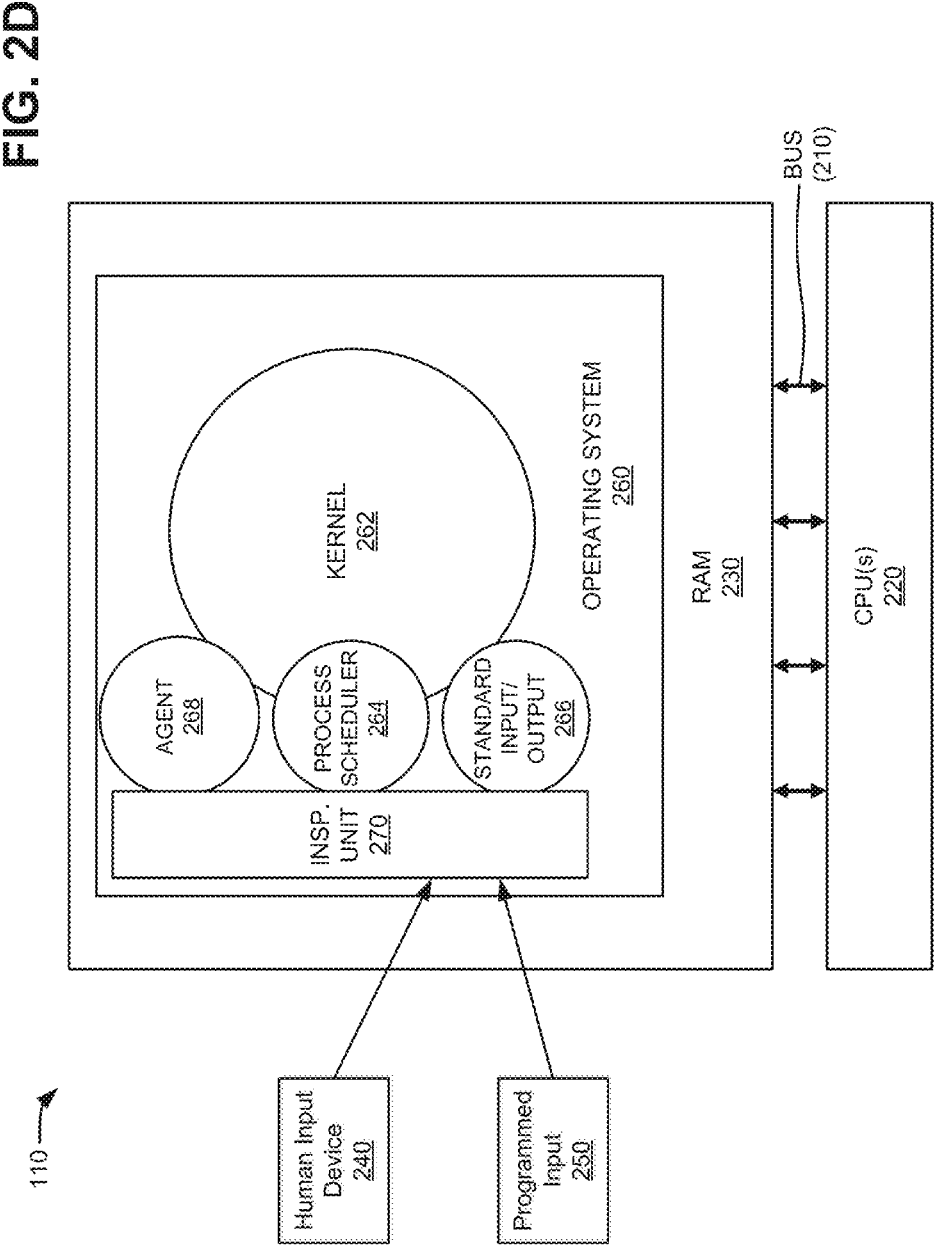

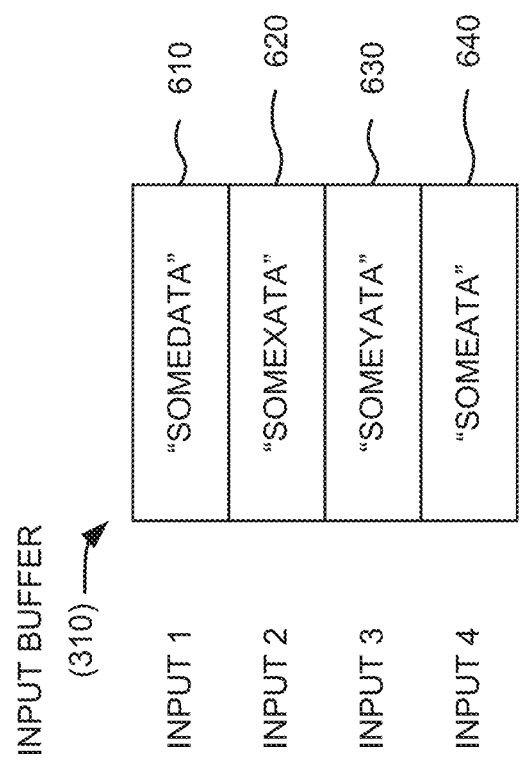

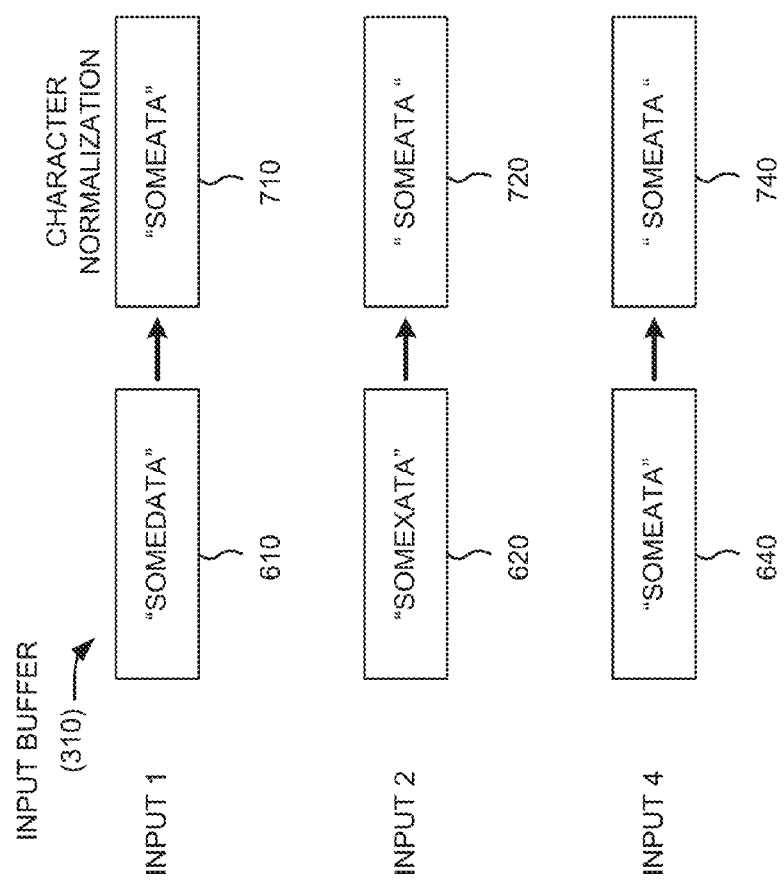

SECURITY ARCHITECTURE FOR MALICIOUS INPUT

BACKGROUND

It is not uncommon for devices in a communication network to be used for malicious purposes to attempt to compromise the network, thereby preventing legitimate devices from enjoying the services of the network. Such an attack is called a "denial-of-service" (DoS) attack, or if multiple devices across the network are used, a "distributed denial-of-service" (DDoS) attack. One approach for implementing a DoS or DDoS attack includes overwhelming a target device or network with external communications, so that it cannot respond to legitimate traffic.

In other instances, devices in a communication network may provide other forms of malicious content to contaminate databases, blogs, and/or social media sites. As just one example, external devices may supply extraneous content to social media sites to alter context metadata that is used to determine advertising content for the site. Such content is often originated using software routines, such as bots. In some instances, human input may also be used (e.g., in a coordinated effort with multiple users) to provide extraneous content.

BRIEF DESCRIPTION OF THE DRAWINGS

FIGS. 1A and 1B are schematics illustrating an exemplary implementation of concepts described herein;

FIGS. 2A-2D are diagrams of components of a computing device of FIG. 1 in which systems and methods described herein may be implemented;

FIG. 6 is a diagram illustrating another type of data that may be normalized by the computing device of FIG. 1;

FIG. 7 is a diagram illustrating a normalization process to resolve character substitution that can be performed by the computing device of FIG. 1; and FIG. 8 is a flow chart of an exemplary process for blocking redundant input, according to implementations described herein.

DETAILED DESCRIPTION OF PREFERRED EMBODIMENTS

The following detailed description refers to the accompanying drawings. The same reference numbers in different drawings may identify the same or similar elements.

Systems and methods described herein may detect and mitigate malicious input at a point of origin before such input invades a communication network. The systems and methods provide a buffering scheme to evaluate a checksum of content before committing the content to an application or network interface.

Failure to evaluate the checksum of content before committing the content (e.g., to an application or network interface) can allow redundant injection of content (also referred to herein as malicious content) into an application or communications network. These redundancies in content can be demonstrated as part of database index degradation and performance breakdown. The malicious content may look similar to normal data, except that it may have a dynamic component that allows the exploitation of the computer programming to let the redundant content pass into data repositories. This storage of redundant content causes downstream issues that result in unnecessary expenses in the form of bandwidth, CPU, RAM, and storage consumption.

According to an implementation described herein, a computing device may receive an initial input string at an operating system kernel and may store, in a cache accessible by the kernel, a copy of the initial input string. The computing device may later receive a second input string by the operating system kernel. The computing device may compare the copy of the initial input string and the second input string for redundancy before committing the second input string (e.g., for use by an application). If the comparison indicates that the copy of the first input string and the second input string are redundant, the computing device may reject the second input.

Figure 1B:
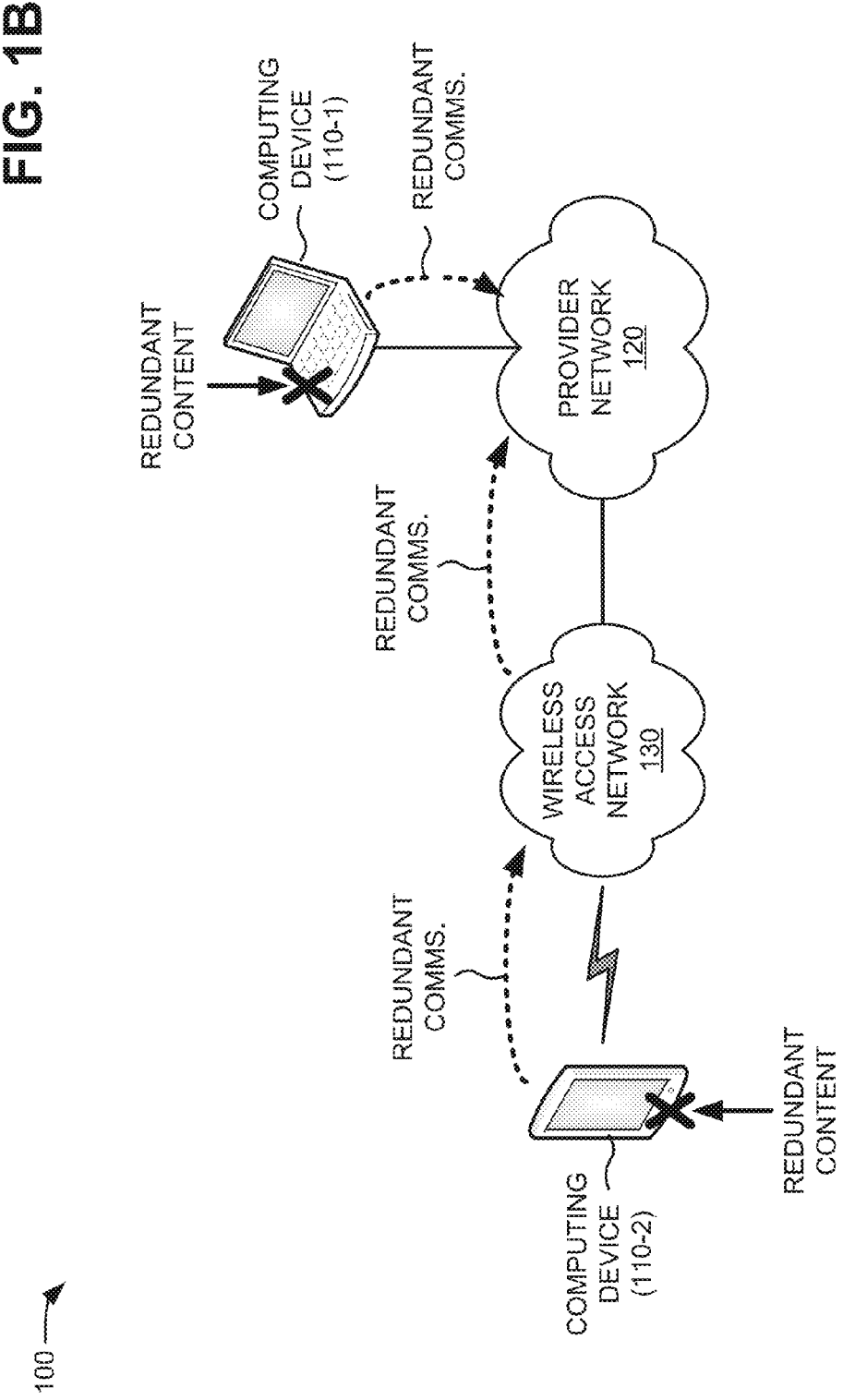

FIGS. 1A and 1B illustrate an exemplary network environment 100 in which systems and/or methods described herein may be implemented. As illustrated, network environment 100 may include computing devices 110-1 and 110-2 (referred to herein collectively as "computing devices 110" and generically as "computing device 110"), a provider network 120, and an access network 130. Devices and/or networks of network environment 100 may interconnect via wired and/or wireless links.

Computing device 110 may include one or more devices capable of storing/executing applications and sending/receiving information (e.g., data, applications, etc.) via one or more of provider network 120 and access network 130. Computing device 110 may include, for example, a personal computer, a computer workstation, a tablet computer, a smartphone, a laptop computer, a portable gaming system, or other types of computation/communication devices.

Provider network 120 may include, for example, a local area network (LAN), a private network (e.g., a company intranet), a wide area network (WAN), a metropolitan area network (MAN), or another type of network that enables communication between computing devices 110 and/or other devices (e.g., devices that provide services to computing devices 110).

Access network 130 may include a communications network that connects subscribed devices (e.g., mobile devices) with provider network 120. In one implementation, access network 130 may include an Internet Protocol (IP)-based network. Generally, access network 130 may include at least one radio access network capable of supporting wireless communications to/from a mobile computing device 110 (e.g., computing device 110-2). The radio access network may include, for example, a long-term evolution (LTE) network or a network implemented in accordance with another existing or future wireless access network standard.

Referring to FIG. 1A, computing devices 110 may be used to provide redundant injection of content into an application or communications network, such as access network 130, provider network 120. The redundant content may be passed through the communications network and may result in, for example, database index degradation and performance breakdown. The redundant content may resemble typical data being processed except the redundant content may have a dynamic component that allows the exploitation of computer programs (e.g., residing on devices in provider network 120) to let them pass into data repositories. This additional data can cause downstream issues that result in unnecessary expenses, such as consumption of bandwidth, CPU, RAM, and storage.

In some instances, detection of malicious content originating from computing device 110 may be detected at a downstream computer program. Generally, stateful inspection of traffic through provider network 120 and/or access network 130 is not possible due to processing costs. Furthermore, latency introduced from stateful inspection can negatively impact the user experience. Also, the use of encryption methods completely negates the capability to perform stateful inspection without violating user privacy. Thus, malicious content that is sent from computing device 110 can provide costly network impact even if the malicious content is eventually detected at a downstream system.

Referring to FIG. 1B, in implementations described herein, computing device 110 may include an inspection unit to perform inspection of input data and block injection of redundant content before the content can enter provider network 120 and/or access network 130. Thus, redundant content can be detected and prevented at the local computing device 110 before the content is passed through provider network 120 and/or access network 130, consuming network resources. In some instances, computing device 110 may inspect and block redundant content at the kernel level and, thus, prevent the redundant content from consuming additional processing resources and/or memory resources of computing device 110.

In FIGS. 1A and 1B, the particular arrangement and number of components of network environment 100 are illustrated for simplicity. In practice there may be more computing devices 110, provider networks 120, access networks 130, and/or devices within the networks. For example, there may be thousands of devices 110.

FIGS. 2A-2D are diagrams illustrating exemplary components of computing device 110. Components of computing device 110 may be implemented/installed as a combination of hardware and software. As shown in FIG. 2A, computing device 110 may include a bus 210, a central processing unit (CPU) 220, a random access memory (RAM) 230, a human input device 240, a programmed input interface 250, an operating system 260, a kernel 262, a process scheduler 264, a standard input/output 266, and an inspection unit 270.

Bus 210 may permit communication among the components of device 200, such as CPU 220 and RAM 230. CPU 220 may include one or more processors or microprocessors that interpret and execute instructions. CPU 220 may include one or more processors, microprocessors, application specific integrated circuits (ASICs), field programmable gate arrays (FPGAs), and/or other processing logic. RAM 230 may include a random access memory (RAM) or another type of dynamic storage device that stores information and instructions for execution by processing unit 220.

Human input device 240 may include a device that permits a user to input information to device 200, such as a keyboard, a keypad, a mouse, a pen, a touch screen, a microphone, one or more biometric mechanisms, and the like. Programmed input 250 may include an interface the enables input from a peripheral device.

Operating system 260 may perform various support functions for components of computing device 110. Operating system 260 may provide interfaces between applications and other components (e.g., human input device 240, programmed input 250, communication interfaces, etc.). In another example, operating system 260 may provide a TCP/IP stack to support communication applications. In addition, operating system 260 may provide other functions, such as thread management, memory management, storage management, etc. Operating system 260 may include kernel 262 with a process scheduler 264, and a standard input/output 266.

Kernel 262 may include hardware or a combination of hardware and software to manage computing resources for computing device 110, including CPU 220, RAM 230, human input device 240, programmed input 250, communication interfaces, etc. Kernel 262 may include one or more device drivers to allow applications to indirectly interact with hardware of computing device 110. For example, kernel 262 may manage memory (e.g., RAM 230), control access to computing device 110, perform input and output services (e.g., for human input device 240 and/or programmed input 250), or allocate processing and/or device resources of computing device 110.

Process scheduler 264 may manage scheduling of threads, processes, and/or data flows to access processing and/or device resources of computing device 110.

Standard input/output 266 may include a data stream or read/write interface to/from a file, hardware resource, or another process.

Inspection unit 270 may inspect an input stream for injection of redundant content into an application or communications network. Inspection unit 270 may evaluate a checksum of input content before committing the content to other components of computing device 110, such as CPU 220, operating system 260, or a network interface (e.g., for provider network 120, access network 130, etc.).

FIGS. 2A-2D illustrate different implementations of inspecting input to computing device 110. As shown in FIG. 2A, in one implementation, inspection unit 270 may evaluate the entire input stream of standard input/output 266 maintained by kernel 262.

Referring to FIG. 2B, inspection unit 270 may evaluate process-specific input from human input device 240 and/or programmed input 250. For example, inspection unit 270 may communicate with process scheduler 264 to detect and inspect input only from particular processes. Thus, inspection unit 270 may differentiate between, for example, input for a web browser, a network stack application latched process, and a local word processing application to focus resources according to the higher-risk inputs.

Referring to FIG. 2C, inspection unit 270 may evaluate input from human input device 240 and/or programmed input 250 for a specific application programmable interface (API) 280. For example, input from human input device 240 and/or programmed input 250 may be provided for a specific part of an application 290 (e.g., a particular field or input type) that calls a particular API 280. Inspection unit 270 may differentiate between inputs for different APIs associated with operating system 260 and inspect only input associated with, for example, the particular API 280. As an example, the configuration of FIG. 2C may be used to inspect input over a particular API, called by a web-based application when the web-based application hooks to an ASIC chipset function locally, to protect provider network 120 or a cloud-based application.

Referring to FIG. 2D, inspection unit 270 may be used in conjunction with an agent 268 evaluate input from human input device 240 and/or programmed input 250. Agent 268 may be associated with kernel 260 and may manage what particular input is evaluated by inspection unite 270. For example, inspection unit 270 may include programmable logic processing (e.g., a Xeno chip, microprocessor, etc.) in conjunction with agent 268 to management of inspection unit 270 resources.

As described herein, computing device 110 may perform certain operations in response to CPU 220 executing software instructions stored in a computer-readable medium, such as RAM 230 or another memory component. A computer-readable medium may include a non-transitory tangible memory device. A memory device may be implemented within a single physical memory device or spread across multiple physical memory devices. The software instructions may be read into the memory component from another computer-readable medium or from another device via a communication interface. The software instructions stored in the memory component may cause CPU 220 to perform processes described herein. Alternatively, hardwired circuitry (e.g., for inspection unit 270, kernel 262, etc.) may be used in place of or in combination with software instructions to implement processes described herein. Thus, implementations described herein are not limited to any specific combination of hardware circuitry and software.

Although FIGS. 2A-2D show exemplary components of computing device 110, in other implementations, computing device 110 may include fewer components, different components, differently-arranged components, or additional components than those depicted in FIGS. 2A-2D. Alternatively, or additionally, one or more components of computing device 110 may perform one or more other tasks described as being performed by one or more other components of computing device 110.

Figure 3:
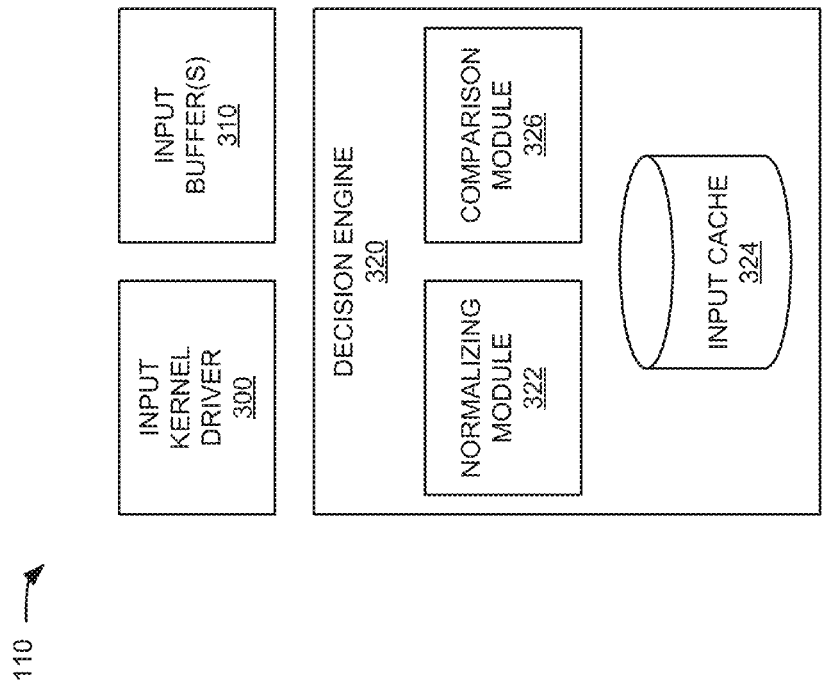
FIG. 3 is a diagram of exemplary functional components of the computing device of FIG. 1.

FIG. 3 is a block diagram of exemplary functional components of computing device 110. In one implementation, the functions described in connection with FIG. 3 may be performed by one or more components of computing device 110. Some or all of the functional blocks of FIG. 3 may be included, for example, as a hardware component (e.g., an ASIC or FPGA). As another example, some of the functional blocks of FIG. 3 may be included in an application (e.g., software) stored in random access memory 230 and executed by processing unit 220. Functional components of computing device 110 may generally permit computing device 110 to detect and mitigate malicious input at the point of origin before such input invades an application or a communication network. As shown in FIG. 3, computing device 110 may include an input kernel 300, an input buffer 310, and a decision engine 320.

Input kernel driver 300 may manage input to computing resources for computing device 110, including processing unit 220, memory 230, and/or communication interface 260. For example, input kernel driver 300 may include a process that manages input and/or output requests from applications and/or other software processes and converts the input and/or output requests into processing instructions for processing unit 220. Additionally, when input from input device 240 is detected, input kernel driver 300 may process the input event. In one implementation, input kernel driver 300 may place the detected input into input buffer 310 associated with OS kernel 222. In another implementation, input kernel driver 300 may place detected input into another location associated with memory 230. In one implementation, functions of input kernel driver 300 may correspond to one or more of kernel 262, process scheduler 264, or standard input/output 266 of FIG. 2.

Input buffer 310 may receive input data from input kernel driver 300. In one implementation, input buffer 310 may queue input data for inspection (e.g., by decision engine 320) before the input data is committed to other resources of computing device 110. In one implementation, input buffer 310 may correspond to standard input/output 266 of FIG. 2.

Decision engine 320 may inspect data from input buffer 310 to determine if the input includes redundant data. In one implementation, one or more functions of decision engine 320 may be performed by inspection unit 270. Decision engine 320 may include a normalizing module 322, an input cache 324, and a comparison module 326. Generally, decision engine 320 may monitor input buffer 310 at particular intervals to determine whether an input event has been placed in input buffer 310. Alternatively, decision engine 320 may receive an indication from input kernel driver 300 that an input event has been placed in input buffer 310. If decision engine 320 detects redundant input data, decision engine 320 may reject the redundant input as malicious. For example, decision engine 320 may simply drop the input data from input buffer 320 without committing the input data to other resources. In another example, decision engine 320 may generate an alert or error message to indicate that malicious input has been detected.

Normalizing module 322 may apply one or more algorithms to normalize data streams (e.g., strings of characters or integers) extracted from input buffer 310. Generally, normalizing module may convert data strings into a common format to allow for detection of similar data that would otherwise pass through a traditional checksum. According to implementations described herein, normalizing module 322 may be included as a software component, as hardware (e.g., an ASIC chipset), or as combination of hardware and software.

Input cache 324 may store normalized input strings generated by normalizing module 322. The normalized input strings in input cache 324 may be used by comparison module 326 to compare against subsequent input strings that may be generated, for example, by software or standard human input. In another implementation, input cache 324 may store initial input in its initial format. Input cache 324 may be includes as software and/or hardware.

In one implementation, entries (e.g., normalized or non-normalized input strings) in input cache 324 may have an expiration time. For example, if a cache entry is not used in comparison with another input sting within a certain time (e.g., between one and five minutes or another time period) the entry may be removed from cache 324. Additionally, entries that are referenced for comparison may be given additional time in cache 324 up to a maximum time (e.g., up to ten or twenty minutes). For example, each reference of a cache entry may reset that entry's cache time limit, up to the maximum total cache time. In another implementation, input cache 224 may include a fixed storage space that may be overwritten from oldest to newest (e.g., a first-in-first-out (FIFO) structure). Additionally, cache 324 may store static entries that may not expire from cache 324.

Comparison module 326 may perform comparisons of input strings extracted from input buffer 310 and/or stored in input cache 324. In one implementation, when comparison module 326 identifies matching input, comparison module 326 may provide a flag or error indication to prevent entry of malicious input. Stopping the ability of the malicious data to be transmitted into computing device 110 and onto provider network 120 or access network 130 may prevent or inhibit downstream consumption of resources from occurring. The downstream resources include bandwidth, web services, middleware, back end computing, data storage, data archiving, etc. In an implementation, comparison module 326 may identify redundant input based on a 100% match of normalized data strings. In another implementation, comparison module 326 may identify redundant input based on a probability of less than a 100% match of normalized or unaltered data strings.

Figure 4:
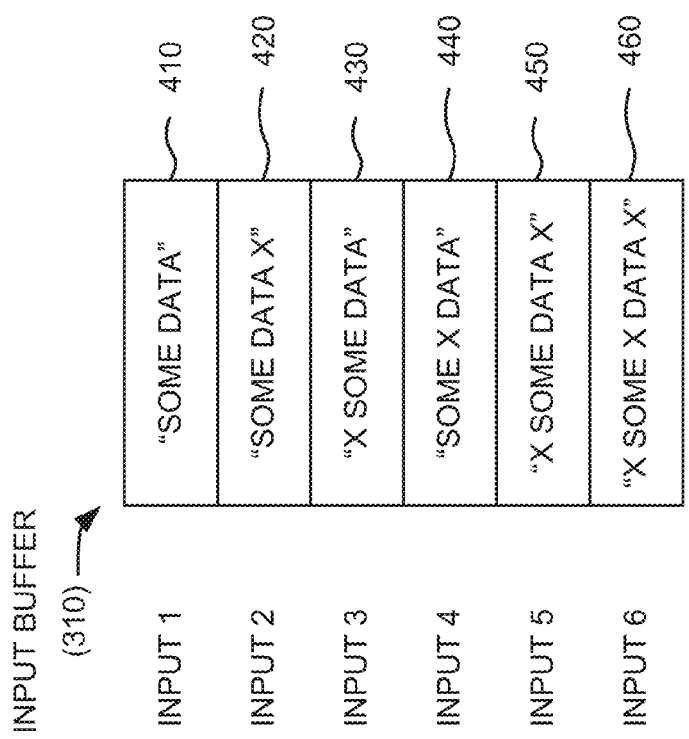
FIG. 4 is a diagram illustrating a type of data that may be normalized by the computing device of FIG. 1.

FIG. 4 is a diagram illustrating one type of data that may be normalized by normalizing module 322 of computing device 110. As shown in FIG. 4, different input strings 410-460 of an input stream (i.e., "input 1," "input 2," . . . "input 6") may be extracted from input buffer 310. The input stream may represent, for example, stream input/output across a computer program being executed on computing device 110.

In comparison with an initial input string 410 (e.g., input 1, "SOME DATA"), one of the input strings 420 ("input 2") may have redundancy from left to right with additional data, such as an integer or symbol (i.e., "SOME DATA X"), to exploit traditional checksum routines. Similarly, another one of the input strings 430 ("input 3") may have redundancy from right to left with additional data (i.e., "X SOME DATA"). A different one of the input strings 440 ("input 4") may have convergence around additional data (i.e., "SOME X DATA"); while still another one of the input strings 450 ("input 5") may have divergence around additional data (i.e., "X SOME DATA X"). In other cases, additional data may be included in one of the buffer streams 460 ("input 6") in multiple positions (i.e., "X SOME X DATA X").

In the example of FIG. 4, assume input string 410 (e.g., "SOME DATA") is initially input into input buffer 310. Subsequently, a nearly identical string, input string 420, is input later in time but with a suffix appendage to the string as "SOME DATA X." A traditional checksum of input stream 420 against input stream 410 may fail, thus letting the redundant content of input stream 420 be passed and injected into downstream resources (e.g., an application on computing device 110, provider network 120, access network 130, a cloud computing structure, etc.) with no benefit.

Each of input strings 420-460 may be referred to as an integer injection problem. In other words, the introduction of any of input streams 420-460 may result in disruption of the normal computer design of many computer programs. The redundant data may be viewed as spam that can damage and/or corrupt the performance of database and computer language index functionality (e.g., in computing device 110 or in downstream devices). Such damage and/or corruption may be particularly evident in complex hashing of data. In other instances, the redundant data may be evidenced as a Denial-of-Service (DOS) attack.

Figure 5:
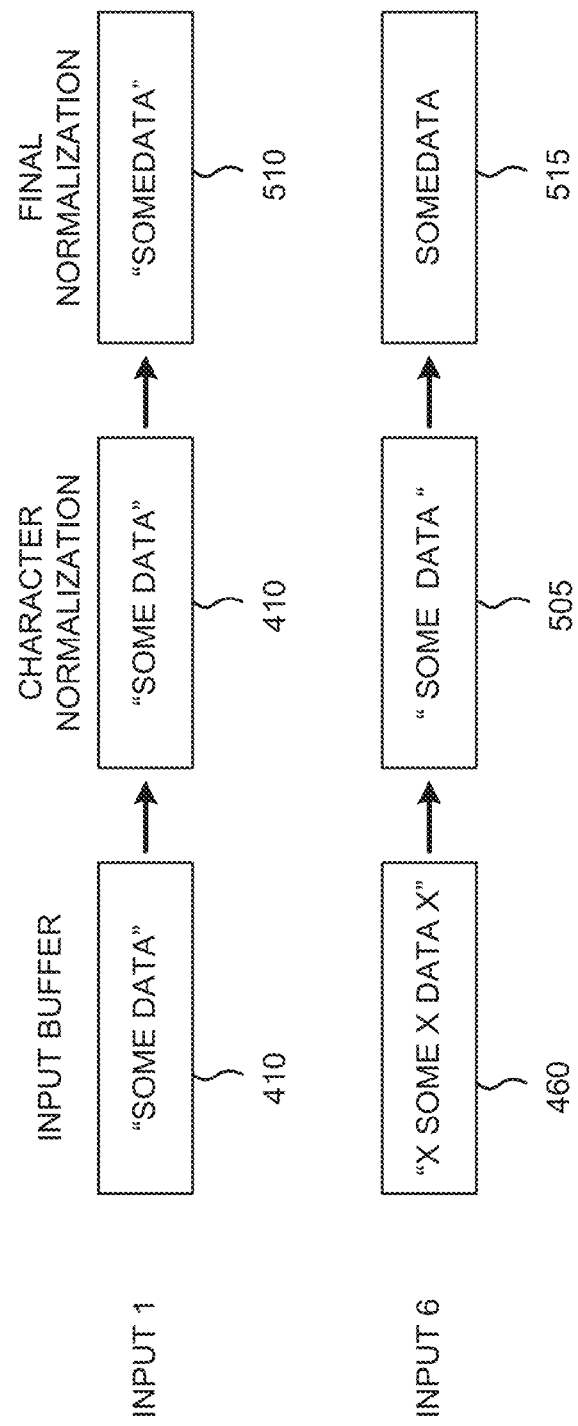
FIG. 5 is a diagram illustrating a normalization process to resolve integer injection that can be performed by the computing device of FIG. 1.

According to one implementation, decision engine 320 may apply an algorithm to resolve the integer injection problem. FIG. 5 is a diagram illustrating a normalization process to resolve integer injection that can be performed by decision engine 320 of computing device 110. In particular, consistent with embodiments described herein, decision engine 320 may extract the integers (e.g., "X") that differ from the data structure for the initial input stream 410. In FIG. 5, input stream 460 from input 6 is used as a detailed illustration herein because it includes all of the scenarios of input strings 420-450.

As shown in FIG. 5, extraneous integers may be removed from the character string value of input stream 460 to provide a character normalized string 505. The remaining spaces and symbols may then be stripped out of both initial input stream 410 and character normalized string 505 to provide a final normalization 510 (i.e., "SOMEDATA") of initial input stream 410 and a final normalization 515 (i.e., "SOME-DATA") of input stream 460. In one implementation, decision engine 320 can be run in a profile so that multiple web session IDs and IP addresses from spoofing do not register as different standard input through the input buffer 310 for the application(s) involved.

FIG. 6 is a diagram illustrating another type of data that may be normalized by decision engine 320 of computing device 110. As shown in FIG. 6, different input strings 610-640 of an input stream (i.e., "input 1," "input 2," "input 3," and "input 4") may be extracted from input buffer 310. The input stream may represent stream input/output across a computer program being executed on computing device 110.

In comparison with an initial input string 610 (e.g., input 1, "SOMEDATA"), each of the input strings 620-640 may have near-redundancy but with replacement or elimination of a character to exploit traditional checksum routines.

In the example of FIG. 6, assume input string 610 is initially input into input buffer 310. Subsequently, nearly identical strings, input string 620 ("SOMEXATA"), input string 630 ("SOMEYATA"), and input string 640 ("SOMEATA") are input later in time. A traditional checksum of input strings 620-640 against input string 610 may fail, thus letting the redundant content of input strings 620-640 become injected into downstream resources. It may be presumed that input strings 620-640 are designed to consume computing resources downstream and have no beneficial information technology value. Input strings 620-640 may have systemic impacts to consumers who wish to legitimately use affected applications, for example, within a cloud computing environment.

According to an implementation, decision engine 320 (e.g., normalizing module 322) may apply an algorithm to resolve the character substitution/elimination problems. FIG. 7 is a diagram illustrating a normalization process to resolve character substitution that can be performed by decision engine 320 of computing device 110.

As shown in FIG. 7, input string 620 may be checked by comparing newer input (e.g., input string 620, "input 2") one character at a time against earlier cached input (e.g., input string 610, "input 1"). The earlier input string 610 (i.e., "input 1") in the cache (e.g., input cache 324) can serve as a standard relative to comparison for spamming. In the particular example of FIG. 7, character-by-character comparison of the first four characters (i.e., "DATA") match 100% until the character "X" is reached at the fifth position in the second input buffer.

When decision engine 320 encounters the inconsistency at the fifth character, a logic decision is made relative to position comparison. The next character is compared in the string and the single point character is not checked. The result is a 100% match of the strings when the fifth character (e.g., "SOMEATA") is omitted. Based on probabilities, "input 2" may be identified as character injection into the standard input string and scores 100%, thus resulting in decision engine 320 flagging the input as redundant input.

Still referring to FIG. 7, in another input scenario, the removal of characters may have occurred, instead of injection of characters. For example, input string 640 may be checked by comparing newer input (e.g., input string 640, "input 4") one character at a time against earlier cached input (e.g., input string 610, "input 1"). As with the previous comparison, the first four characters (i.e., "DATA") match 100% until the character "A" is reached at the fifth position in the input string 640. When decision engine 320 encounters the inconsistency at the fifth character, a virtual fork in the algorithm can be introduced to resolve inconsistency. The score (e.g., a matching probability score) of adjacent characters in input string 640 is checked to a shift in the window for the standard input string 610 by n+1 characters. Thus, comparison of character normalization 710 (e.g., "SOMEATA") and character normalization 740 (e.g., "SOMEATA") yields a match 100% match. The comparison may be performed in a way that takes into consideration the number of characters (i.e., "n") removed in the glide patch for the strings when determining a matching probability score.

Character elimination can grow with valid deviation in the content. This can be resolved simply by limiting the number of the characters in the injection algorithm such that actual phrases are not being removed (i.e. valid words) and a string check against a cached dictionary to halt the virtual fork of the algorithm can occur when valid word injection is occurring.

FIG. 8 depicts a flow chart of an exemplary process 800 for blocking redundant input according to implementations described herein. In one implementation, process 800 may be performed by one or more components of computing device 110.

As illustrated in FIG. 8, process 800 may include adding a first input from a kernel to a cache (block 810), and receiving a second input at the kernel (block 820). For example, computing device 110 may receive an input string from an application or user interface. Input kernel driver 300 may buffer the input string, and decision engine 320 may add a copy of the buffered input into input cache 324. A second input string may be subsequently received at input kernel driver 300.

Process 800 may also include normalizing the first and/or second input (block 830) and comparing the normalized inputs (block 840). For example, computing device 110 (e.g., decision engine 320) may apply one or more algorithms, such as those described in connection with FIGS. 4-7, to normalize an initial input string or any subsequent input string to permit comparison.

Process 800 may further include determining if the second input is redundant input (block 850). For example, decision engine 320 may compare the subsequent input string with the initial input string stored in input cache 324. According to implementations described herein, decision engine 320 may perform the comparison before committing the subsequent input string.

If the second input is redundant input (block 850—YES), the second input may be rejected (block 860). For example, when the comparison indicates that the copy of the first input string and the subsequent input string are redundant, decision engine 320 may reject the subsequent input string as malicious input. In one implementation, decision engine 320 may simply deny entry of the subsequent input string. In another implementation, decision engine 320 may generate an alert or error message to indicate that malicious input has been detected.

If the second input is not redundant input (block 850—NO), a copy of the second input may be added to the cache (block 870), and the second input may be committed (block 880). For example, when the comparison indicates that the copy of the first input string and the subsequent input string are not redundant, decision engine 320 may simply commit the subsequent input string and add a copy of the subsequent input string to input cache 324 for use in future comparisons.

Systems and methods described herein may detect and mitigate malicious input at the point of origin before such input invades a communication network. A computing device may receive, at an operating system kernel, a first input string and may store, in a cache accessible to the kernel, a copy of the first input string. The computing device may receive, at the operating system kernel, a second input string and may compare the copy of the first input string and the second input string for redundancy before committing the second input string. The computer device may reject the second input when the comparing indicates that the copy of the first input string and the second input string are redundant.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
receiving, at a kernel of an operating system on a computing device, a first input string of content from a particular process of multiple different processes for the operating system;
storing, in a cache accessible by the kernel, a copy of the first input string;
receiving, at the kernel, a second input string of content from the particular process;
comparing, at the kernel and before committing the second input string to an application or communication interface of the computing device, the copy of the first input string and the second input string for redundant content; and
rejecting, by the computing device, the second input when the comparing indicates that the copy of the first input string and the second input string have redundant content.

2. The method of claim 1, wherein the first input string and the second input string are generated from one or more applications on the computing device.

3. The method of claim 1, wherein the storing the copy of the first input string includes storing the copy of the first input string for up to a variable expiration time.

4. The method of claim 1, wherein storing a copy of the first input string includes applying a profile to associate the first input string with multiple web session identifiers or Internet protocol (IP) addresses.

5. The method of claim 1, wherein comparing the copy of the first input string and the second input string for redundancy includes applying algorithms to detect, in the second input string when compared with the copy of the first input string, instances of:
integer insertion,
character substitution, and
character deletion.

6. The method of claim 1, wherein rejecting the second input includes rejecting the second input before the second input string is provided to an application.

7. The method of claim 1, further comprising:
providing the second input string to an application, when the comparing indicates that the copy of the first input string and the second input string are not redundant.

8. The method of claim 1, further comprising:
storing, in the cache accessible by the kernel, the second input string, when the comparing indicates that the copy of the first input string and the second input string are not redundant.

9. The method of claim 1, wherein the first input string and the second input string include human input via a user interface on the computing device.

10. The method of claim 1, wherein the comparing the copy of the first input string and the second input string is performed by an application specific integrated circuit (ASIC) chipset.

11. A computing device, comprising:
a memory to store instruction; and
one or more processors configured to execute the instructions in the memory to:
receive, at an operating system kernel, a first input string of content from a particular process of multiple different processes for the operating system,
store, in a portion of the memory accessible to the operating system kernel, a copy of the first input string,
receive, at the operating system kernel, a second input string of content from the particular process,
compare, before committing the second input string from the operating system kernel to other components of computing device, the copy of the first input string and the second input string for redundant content, and
reject, before committing the second input string from the operating system kernel to other components of computing device, the second input when the comparing indicates that the copy of the first input string and the second input string are redundant.

12. The computing device of claim 11, wherein, when rejecting the second input, the one or processors is further configured to:
generate a message to indicate that redundant input data has been detected.

13. The computing device of claim 11, wherein the one or more processors includes an application specific integrated circuit (ASIC) to compare the copy of the first input string and the second input string.

14. The computing device of claim 11, wherein the one or more processors includes software to compare the copy of the first input string and the second input string.

15. The computing device of claim 11, wherein, when comparing the copy of the first input string and the second input string, the one or more processors are configured to:
normalize the copy of the first input string to create a normalized first input string,
normalize the second input string to create a normalized second input string, and
compare the normalized first input string and the normalized second input string.

16. The computing device of claim 15, wherein, when normalizing the second input string, the one or more processors are further configured to:
eliminate inserted integers, symbols, or spaces from the second input string.

17. The computing device of claim 11, wherein, when comparing the copy of the first input string and the second input string, the one or more processors are configured to:
perform a character-by-character comparison of the second input string with the copy of the first input string,
identify one of a character substitution or character elimination from the second input string based on the character-by-character comparison,
removing, from at least one of the second input string and the copy of the first input string, input corresponding to the substituted character position or the eliminated character position to create a normalized first input string and a normalized second input string, and
evaluate redundancy of the normalized second input string against the normalized first input string.

18. A non-transitory computer-readable medium comprising computer-executable instructions, the computer-readable medium comprising one or more instructions to:
receive, at an operating system kernel, a first input string of content from a particular process of multiple different processes for the operating system;
store, in a portion of memory accessible to the operating system kernel, a copy of the first input string;
receive, at the operating system kernel, a second input string of content from the particular process;
compare, before committing the second input string from the operating system kernel to other components of a computing device that includes the kernel, the copy of the first input string and the second input string for redundant content; and
reject, before committing the second input string from the operating system kernel to other components of a computing device that includes the kernel, the second input when the comparing indicates that the copy of the first input string and the second input string are redundant.

19. The non-transitory computer-readable medium of claim 18, further comprising one or more instructions to:
generate a message to a user to indicate that redundant input data has been detected, when the comparing indicates that the copy of the first input string and the second input string are redundant.

20. The non-transitory computer-readable medium of claim 18, further comprising one or more instructions to:
store, in the portion of the memory accessible to the kernel, the second input string, when the comparing indicates that the copy of the first input string and the second input string are not redundant; and
provide the second input string to an application, when the comparing indicates that the copy of the first input string and the second input string are not redundant.

* * * * *